(12) United States Patent
Varteresian et al.

(10) Patent No.: US 12,323,404 B2
(45) Date of Patent: Jun. 3, 2025

(54) SECURING DATA FOR DYNAMIC ENVIRONMENT

(71) Applicant: Dell Products L.P., Round Rock, TX (US)

(72) Inventors: Michael G. Varteresian, Lexington, MA (US); Shaojuan Lin, Shanghai (CN); Eric O'Callaghan, Macroom (IE); Wenfeng Li, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 423 days.

(21) Appl. No.: 17/709,054

(22) Filed: Mar. 30, 2022

(65) Prior Publication Data

US 2023/0315866 A1 Oct. 5, 2023

(51) Int. Cl.
*H04L 9/40* (2022.01)
*G06F 9/48* (2006.01)
*G06F 21/53* (2013.01)
*G06F 21/60* (2013.01)
(Continued)

(52) U.S. Cl.
CPC .......... *H04L 63/068* (2013.01); *G06F 9/4856* (2013.01); *G06F 21/53* (2013.01); *G06F 21/602* (2013.01); *G06F 21/6218* (2013.01); *H04L 9/3215* (2013.01)

(58) Field of Classification Search
CPC ... H04L 63/068; H04L 9/0894; H04L 63/062; H04L 9/0891; H04L 9/08; H04L 63/06; H04L 9/3215; H04L 9/0822; H04L 9/0863; H04L 63/0428; H04L 9/085; H04L 9/0827; H04L 9/0877; H04L 9/3234; H04L 9/14; G06F 21/602; G06F 21/53; G06F 9/45558; G06F 21/72; G06F 21/57; G06F 21/6218
See application file for complete search history.

(56) References Cited

U.S. PATENT DOCUMENTS

| | | |
|---|---|---|
| 8,572,410 B1 | 10/2013 | Tkacik |
| 8,977,842 B1 | 3/2015 | McCorkendale |
| 9,667,416 B1 * | 5/2017 | Machani ............... H04L 9/3215 |

(Continued)

FOREIGN PATENT DOCUMENTS

CN   102208001 A  * 10/2011  ............. G06F 21/53

OTHER PUBLICATIONS

Non-Final Office Action, U.S. Appl. No. 17/584,884 mailed Apr. 1, 2024, U.S. Patent and Trademark Office.
(Continued)

*Primary Examiner* — Kyung H Shin
(74) *Attorney, Agent, or Firm* — Jackson Walker L.L.P.

(57) ABSTRACT

An information handling system may include at least one processor and a memory. The information handling system may be configured to: store a cryptographic lockbox that is secured by a set of secrets and that is accessible from a virtual machine, wherein the set of secrets comprises a first subset of one or more secrets based on a hardware environment of the information handling system and a second subset of one or more secrets based on a virtualized environment associated with the virtual machine; migrate the virtual machine to a different information handling system, wherein the migration is configured not to alter the second subset; and access the cryptographic lockbox from the migrated virtual machine.

15 Claims, 2 Drawing Sheets

(51) Int. Cl.
    *G06F 21/62*          (2013.01)
    *H04L 9/32*           (2006.01)

(56) References Cited

U.S. PATENT DOCUMENTS

| | | |
|---|---|---|
| 10,922,420 B2 * | 2/2021 | Allo .................. G06F 21/6218 |
| 11,849,037 B1 | 12/2023 | Tong |
| 2009/0132804 A1 | 5/2009 | Paul |
| 2012/0204030 A1 | 8/2012 | Nossik |
| 2013/0191648 A1 | 7/2013 | Bursell |
| 2013/0326110 A1 | 12/2013 | Tsirkin et al. |
| 2018/0145955 A1 * | 5/2018 | Nirwal .................. H04L 63/068 |
| 2018/0276019 A1 | 9/2018 | Ali |
| 2019/0065756 A1 | 2/2019 | Tsirkin |
| 2019/0332421 A1 | 10/2019 | Kozlowski et al. |
| 2020/0034167 A1 | 1/2020 | Parthasarathy |
| 2021/0173685 A1 | 6/2021 | Tsirkin |
| 2022/0103520 A1 | 3/2022 | Chifor |

OTHER PUBLICATIONS

Final Office Action, U.S. Appl. No. 17/584,884 mailed Aug. 26, 2024, U.S. Patent and Trademark Office.

* cited by examiner

SECURING DATA FOR DYNAMIC ENVIRONMENT

TECHNICAL FIELD

The present disclosure relates in general to information handling systems, and more particularly to providing data security in a dynamic environment. This application is related to U.S. patent application Ser. No. 17/584,884, filed Jan. 26, 2022 and entitled "MAINTAINING SECURITY DURING LOCKBOX MIGRATION" (the '884 application) which is incorporated by reference herein in its entirety.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

HCI systems may implement some types of functionality via VMs of various types. Each such VM often has its own set of credentials (e.g., usernames, passwords, etc.) that are used to perform setup and ongoing management operations.

Storing these credentials enables automated operations that can significantly improve a customer's experience. However, it is important that the credentials be stored securely. Some embodiments store credentials in a cryptographic lockbox (e.g., stored as key-value pairs such as username-password pairs). A cryptographic lockbox is generally implemented as a file that has been encrypted using a cryptosystem. For example, an RSA lockbox uses Rivest-Shamir-Adleman encryption, and other types of lockbox may use other cryptosystems. For purposes of this disclosure, the term "lockbox" should be understood to include any cryptographic data storage that is secured by one or more secrets.

In one embodiment, credentials may be stored in a management VM of a cluster. The credentials should be accessible during normal operations, but they should not be accessible if the lockbox is removed from its original environment or if an unauthorized user gains access to the VM. Malicious actors may use operations like VM cloning or copying to attempt to gain access to the lockbox, and the lockbox should be resistant to such attempts.

However, an HCI environment can be fairly "dynamic," in that many legitimate changes to the cluster environment (e.g., node expansion, node removal, live VM migration from one node to another, etc.) are common and should be accounted for. Thus, there are many situations that do include the legitimate creation of a new VM and migration of the existing VM's operations with its lockbox to the new VM. The credentials should be accessible after these operations have been completed. However, the steps required for these legitimate operations may be similar to the steps that a malicious actor might employ to try to gain access to the lockbox (e.g., making a copy of a VM to attempt to gain access to its lockbox). Thus embodiments of this disclosure may provide a way of supporting legitimate operations such as those mentioned above, without sacrificing the overall security of the infrastructure.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with securing data may be reduced or eliminated.

In accordance with embodiments of the present disclosure, an information handling system may include at least one processor and a memory. The information handling system may be configured to: store a cryptographic lockbox that is secured by a set of secrets and that is accessible from a virtual machine, wherein the set of secrets comprises a first subset of one or more secrets based on a hardware environment of the information handling system and a second subset of one or more secrets based on a virtualized environment associated with the virtual machine; migrate the virtual machine to a different information handling system, wherein the migration is configured not to alter the second subset; and access the cryptographic lockbox from the migrated virtual machine.

In accordance with these and other embodiments of the present disclosure, a method may include storing a cryptographic lockbox that is secured by a set of secrets and that is accessible from a virtual machine, wherein the set of secrets comprises a first subset of one or more secrets based on a hardware environment of the information handling system and a second subset of one or more secrets based on a virtualized environment associated with the virtual machine; migrating the virtual machine to a different information handling system, wherein the migration is configured not to alter the second subset; and accessing the cryptographic lockbox from the migrated virtual machine.

In accordance with these and other embodiments of the present disclosure, an article of manufacture may include a non-transitory, computer-readable medium having computer-executable instructions thereon that are executable by a processor of an information handling system for: storing a cryptographic lockbox that is secured by a set of secrets and that is accessible from a virtual machine, wherein the set of secrets comprises a first subset of one or more secrets based on a hardware environment of the information handling system and a second subset of one or more secrets based on a virtualized environment associated with the virtual machine; migrating the virtual machine to a different information handling system, wherein the migration is configured not to alter the second subset; and accessing the cryptographic lockbox from the migrated virtual machine.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
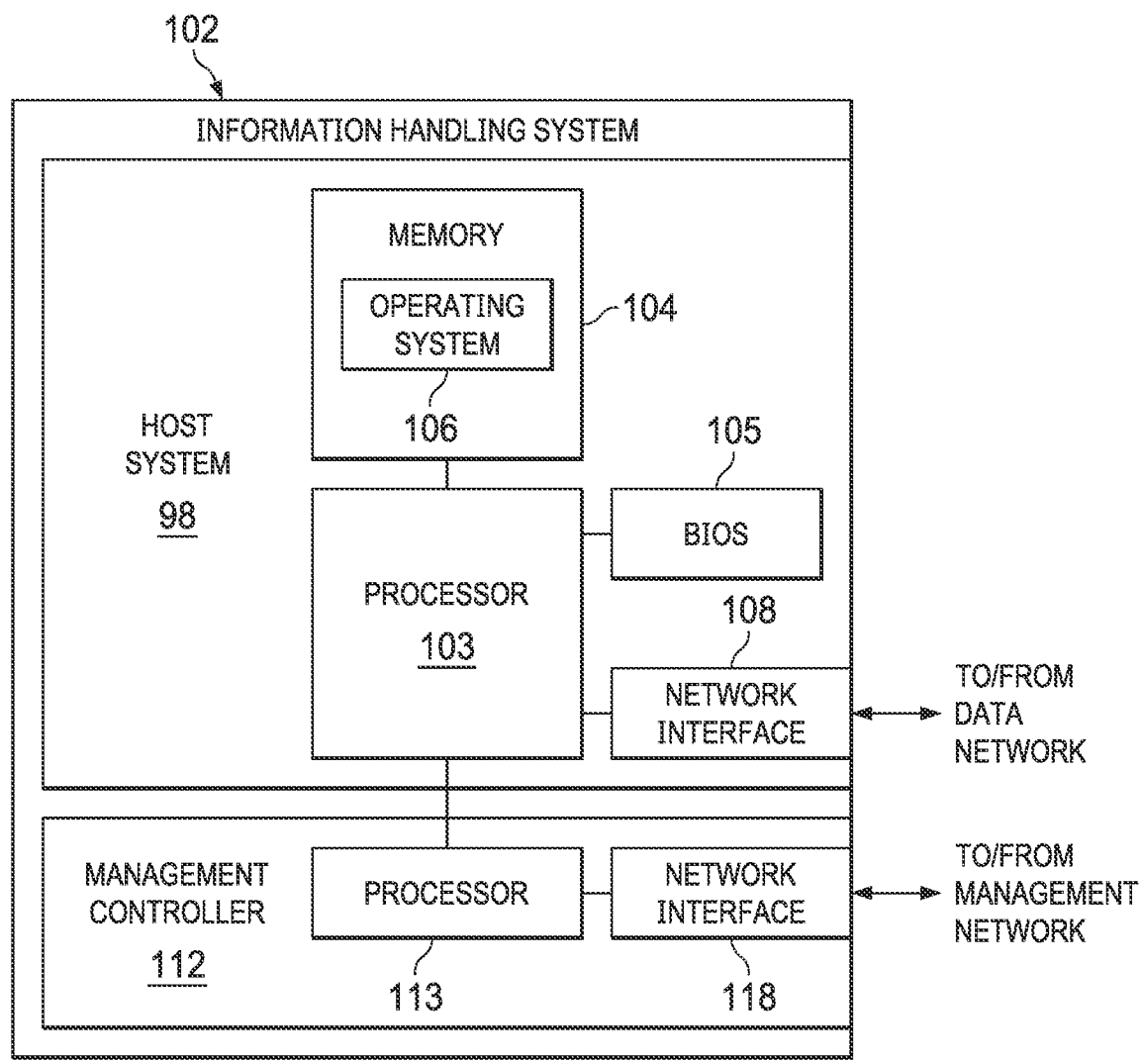
FIG. 1 illustrates a block diagram of an example information handling system, in accordance with embodiments of the present disclosure.
Figure 2:
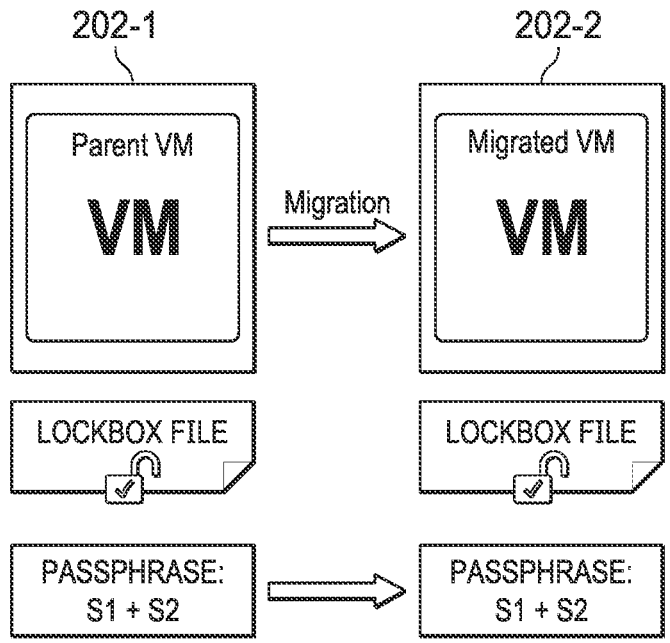
FIG. 2 illustrates migration of a virtual machine with a cryptographic lockbox, in accordance with embodiments of the present disclosure.
Figure 3:
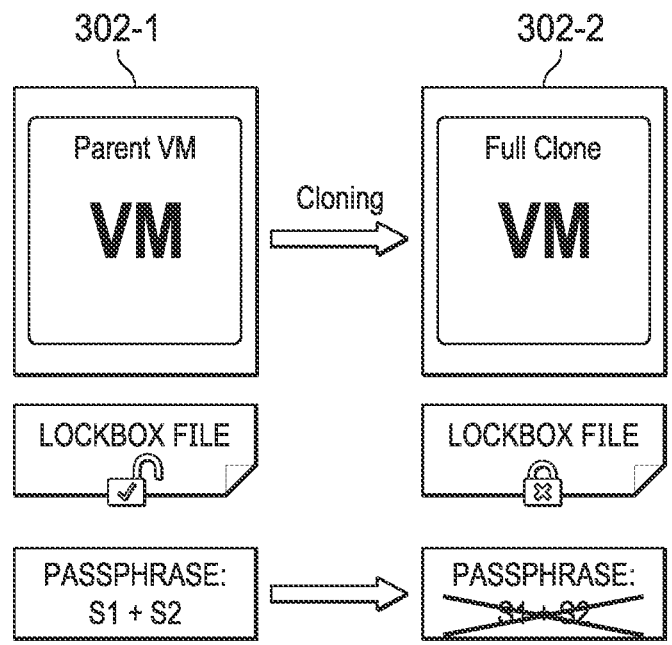
FIG. 3 illustrates cloning of a virtual machine with a cryptographic lockbox, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may provide security for information such as credentials stored in a cryptographic lockbox in a dynamic environment. It is desirable that when a VM is migrated from one host to another (e.g., by using a live migration technique such as VMWare vMotion), the protected data can still be accessed. However, when a VM is cloned or when the protected lockbox file is copied to an environment outside the VM and/or outside the HCI cluster, the protected data should not be accessible.

In one embodiment, a lockbox may be secured by one or more pieces of secret data. For example, the secrets that protect access to a lockbox may include values that are derived from the local hardware and/or software environment that are difficult to duplicate in a different environment.

In situations in which more than one piece of secret data is used, the pieces of secret data may first be combined (e.g., concatenated) into a single secret. This single secret may then be hashed or otherwise transformed in order to derive a cryptographic key, which may be used to encrypt (and later decrypt) the credentials stored in the lockbox.

Accordingly, embodiments of this disclosure may employ a dynamic passphrase, which may comprise multiple items of secret data. These items may be selected such that at least one of the items may change in scenarios where the lockbox should not be accessible (e.g., VM cloning or lockbox file copying), but all of the items may remain the same in scenarios in which continued access is desirable (e.g., VM migration).

In some embodiments, one or more items of secret data may be derived from different layers of an HCI system, and these may be combined to derive a single secret used to protect a lockbox. For example, various secrets may be derived from top-level logical objects (e.g., logical objects that exist at the level of full HCI clusters), lower-level logical objects (e.g., logical objects that exist at the level of individual hosts or individual VMs), and/or the underlying hardware objects (e.g., disks, network interface cards, etc.). A logical object or a value derived therefrom (e.g., an identifier, an attribute, a hash, etc.), a hardware identifier, or any other suitable value may be used as an item of secret data. This allows a set of secrets to be chosen with a desired balance of characteristics that will allow normal operations to proceed, but which will prevent operation in other scenarios.

In one embodiment, such secrets may be based on partially or wholly random or pseudorandom items of data that are associated with the objects discussed above. Some of such items of data may be specific to an HCI cluster, while others may be specific to a particular host, a particular VM, a particular hardware element, etc. In one embodiment, one or more of such items of data may be secrets that are accessible only with root- or administrator-level access (generally referred to as privileged users).

A passphrase may then be constructed that incorporates a plurality of such items of data. For example, in an embodiment in which two items of secret data S1 and S2 are used, a lockbox may be protected by a passphrase consisting of the concatenation of S1 and S2 (referred to as S1+S2). In other embodiments, more or fewer items of secret data may be used. For example, in one embodiment, only a single item of secret data may be used. In other embodiments, S1 and/or S2 may be sets of items of secret data (also referred to as subsets of the secret that protects the lockbox).

In particular, S1 and S2 may be selected such that neither of them is changed during a VM migration, and so the lockbox may remain accessible after such an operation. But one or both of them may change during a VM cloning or lockbox file copying, and so access to the lockbox may be effectively revoked in those situations.

FIG. 2 illustrates a migration of a parent VM from a host system 202-1 to a migrated VM executing on a host system 202-2, according to some embodiments. The migrated VM is essentially the "same" VM as the parent VM, and so the items of secret data S1 and S2 both remain unchanged. After migration, the migrated VM executing on host system 202-2 maintains access to the lockbox file. In particular, the migrated VM may be operating in the same environment (e.g., the same HCI cluster), and the items of secret data may be based on that environment. If the migrated VM were operated in a different environment, this change may be sufficient to alter one or more of the items of secret data, and so access may be revoked.

FIG. 3 illustrates a cloning of a parent VM from a host system 302-1 to a full clone VM executing on a host system 302-2, according to some embodiments. The cloned VM is a copy of the parent VM (e.g., made by copying the file(s) associated with the parent VM). However, unlike the situation in FIG. 2, the cloned VM is not the "same" VM as the parent VM. In particular, S2 is different in the new environment, and so the cloned VM is unable to access the lockbox file. For example, S2 may be tied to the particular instance of the VM. While the cloned VM is functionally the same (e.g., it has the same operating system, etc.), it nevertheless is a different object from the perspective of the hypervisor. Therefore, S2 has changed, and the lockbox is not accessible.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   store a cryptographic lockbox that is a component of a virtual machine, wherein the cryptographic lockbox is secured by a set of secrets and is accessible from the virtual machine, and wherein the set of secrets comprises a first subset of one or more secrets based on a hardware environment of the information handling system and a second subset of one or more secrets based on a virtualized environment associated with the virtual machine, wherein the second subset is inaccessible to non-privileged users of the information handling system;
   migrate the virtual machine to a different information handling system, wherein the migration is configured not to alter the second subset; and
   access the cryptographic lockbox from the migrated virtual machine.

2. The information handling system of claim 1, wherein the hardware environment comprises a hyper-converged infrastructure cluster.

3. The information handling system of claim 2, wherein the first subset comprises a virtual object associated with the cluster.

4. The information handling system of claim 1, wherein the second subset comprises an attribute of the virtual machine.

5. The information handling system of claim 1, wherein the cryptographic lockbox is secured by concatenating the secrets of the first and second subsets to generate a concatenated result, deriving a cryptographic key from the concatenated result, and encrypting the cryptographic lockbox with the cryptographic key.

6. A computer-implemented method comprising:
   storing a cryptographic lockbox that is a component of a virtual machine, wherein the cryptographic lockbox is secured by a set of secrets and is accessible from the virtual machine, and wherein the set of secrets comprises a first subset of one or more secrets based on a hardware environment of the information handling system and a second subset of one or more secrets based on a virtualized environment associated with the virtual machine, wherein the second subset is inaccessible to non-privileged users of the information handling system;

migrating the virtual machine to a different information handling system, wherein the migration is configured not to alter the second subset; and accessing the cryptographic lockbox from the migrated virtual machine.

7. The method of claim 6, wherein the hardware environment comprises a hyper-converged infrastructure cluster.

8. The method of claim 7, wherein the first subset comprises a virtual object associated with the cluster.

9. The method of claim 6, wherein the second subset comprises an attribute of the virtual machine.

10. The method of claim 6, wherein the cryptographic lockbox is secured by concatenating the secrets of the first and second subsets to generate a concatenated result, deriving a cryptographic key from the concatenated result, and encrypting the cryptographic lockbox with the cryptographic key.

11. An article of manufacture comprising a non-transitory, computer-readable medium having computer-executable instructions thereon that are executable by a processor of an information handling system for:

storing a cryptographic lockbox that is a component of a virtual machine, wherein the cryptographic lockbox is secured by a set of secrets and is accessible from the virtual machine, and wherein the set of secrets comprises a first subset of one or more secrets based on a hardware environment of the information handling system and a second subset of one or more secrets based on a virtualized environment associated with the virtual machine, wherein the second subset is inaccessible to non-privileged users of the information handling system;

migrating the virtual machine to a different information handling system, wherein the migration is configured not to alter the second subset; and accessing the cryptographic lockbox from the migrated virtual machine.

12. The article of claim 11, wherein the hardware environment comprises a hyper-converged infrastructure cluster.

13. The article of claim 12, wherein the first subset comprises a virtual object associated with the cluster.

14. The article of claim 11, wherein the second subset comprises an attribute of the virtual machine.

15. The article of claim 11, wherein the cryptographic lockbox is secured by concatenating the secrets of the first and second subsets to generate a concatenated result, deriving a cryptographic key from the concatenated result, and encrypting the cryptographic lockbox with the cryptographic key.

* * * * *